United States Patent
Ostergard

(10) Patent No.: US 6,914,635 B2
(45) Date of Patent: Jul. 5, 2005

(54) MICROMINIATURE ZOOM SYSTEM FOR DIGITAL CAMERA

(75) Inventor: Toni Ostergard, Turku (FI)

(73) Assignee: Nokia Mobile Phones, Ltd., Espoo (FI)

( * ) Notice: Subject to any disclaimer, the term of this patent is extended or adjusted under 35 U.S.C. 154(b) by 695 days.

(21) Appl. No.: 09/779,416

(22) Filed: Feb. 8, 2001

(65) Prior Publication Data

US 2004/0201773 A1 Oct. 14, 2004

(51) Int. Cl.⁷ .............................................. H04N 5/225
(52) U.S. Cl. ...................... 348/374; 348/340; 348/351; 348/240.3
(58) Field of Search ................................ 348/374, 340, 348/240.3, 351, 357, 240.99

(56) References Cited

PUBLICATIONS

"Electrostatic Linear Microactuator Mechanism for Focusing a CCD Camera" by Koga, et al., Journal of Lightwave Technology, vol. 17, No. 1, Jan. 1999; p. 43–47.*

* cited by examiner

Primary Examiner—Wendy R. Garber
Assistant Examiner—Gary C. Vieaux
(74) Attorney, Agent, or Firm—Perman & Green, LLP

(57) ABSTRACT

A digital camera for use in a communication device in which the image sensor is formed on a substrate and is mounted on a micro-electromechanical system for movement relative to the camera lens to provide an autofocus capability. In addition the lens may be mounted on a micro-electromechanical system for movement relative to the image sensor to provide both an autofocus and a zoom capability.

12 Claims, 4 Drawing Sheets

MICROMINIATURE ZOOM SYSTEM FOR DIGITAL CAMERA

BACKGROUND OF THE INVENTION

Mobile communications devices are becoming more compact while their functions and features are ever expanding. As a next step in this process of expanding applications, a digital camera may be installed. This requires a new cycle of development with respect to the digital camera in order to package the necessary functions within the compact profile of the mobile communications device. In order to miniaturize the camera for such use, the zoom feature is often eliminated or substantially reduced in functionality. This is because the apparatus needed to move the lens in a traditional zoom mechanism is cumbersome. The development is facilitated by the introduction of digital, semi-conductor, imaging sensors, such as CCD and C-MOS sensor arrays.

In addition a new class of micro-miniature components have become available that provide the functionality of both electrical and mechanical components. These components are fabricated in a process similar to the manufacture of integrated circuit chips, namely the surface treatment of silicon wafers. These mechanisms can provide the function of sensors (resonators), actuators, transducers, motors, and gears to high tolerances. By micro-machining silicon wafers layered on a substrate, the components, of the so called micro-electromechanical system (MEMS), are constructed on a thin substrate. A description of MEMS components is contained in Philosophical Transactions of the Royal Society: Physical Sciences and Engineering, Series A, Issue No. 1703, Dec. 15, 1995, pp. 355–366, which is incorporated herein by reference.

It is a purpose of this invention to provide an autofocus and zoom system for a compact electronic device. A further purpose of this invention is to provide these functions by using a sensor array, such as a C-MOS sensor array, and a lens actuation mechanism suitable for fabrication on a silicon wafer. It is a further purpose of this invention to utilize the advantages of micro-electromechanical system (MEMS) manufacturing techniques to obtain these goals.

SUMMARY OF THE INVENTION

A miniaturized digital camera is constructed for use with a mobile communication device or other compact appliance. The optical system of the camera consists of a small lens system having the traditional components of a primary lens, a variator lens, and a compensator lens. The lens system transmits the image received from an external source to a sensor array. The sensor array is constructed on a substrate using silicon wafer fabrication techniques and is positioned to receive the image from the lens system. The array is operatively associated with a micro-electro mechanical component for movement between at least two positions by actuation of the MEMS component. Both the array and the MEMS component are constructed on the same substrate utilizing similar techniques to create an extremely small fully functional imaging system for use with the lens system. Actuation of the MEMS component, will move the sensor array relative to the lens system. Such actuation of the MEMS component, can be accomplished in response to, for example, the sensed distance of the lens system from the subject of the image. In this manner an autofocus function can be accomplished. The movement of the sensor is combined with a coordinated movement of the variator and/or compensator lenses to provide a zoom function. To facilitate this coordinated movement one or both of these lens can be mounted for movement on the MEMS component in operative association with the sensor array. Since the position of the sensor array can be varied the movement of the lens-system/lenses could in some cases be reduced. With a suitable lens design and by moving the sensor array itself, it could e.g. be possible to reduce or completely omit the movement of one of the lenses, e.g. the compensator. In this manner a variety of configurations can be accomplished to provide the zoom and autofocus functions in a miniaturized version of the traditional system.

DESCRIPTION OF THE DRAWING

The subject invention is described in more detail below with reference to the drawing in which.

DETAILED DESCRIPTION OF THE INVENTION

Figure 1B:
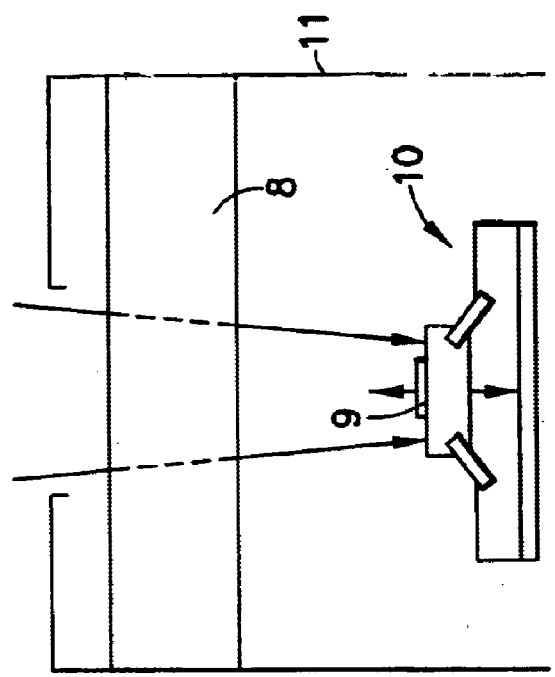
FIG. 1b is a schematic illustration of a lens system in which the sensor array is mounted for movement.
Figure 1A:
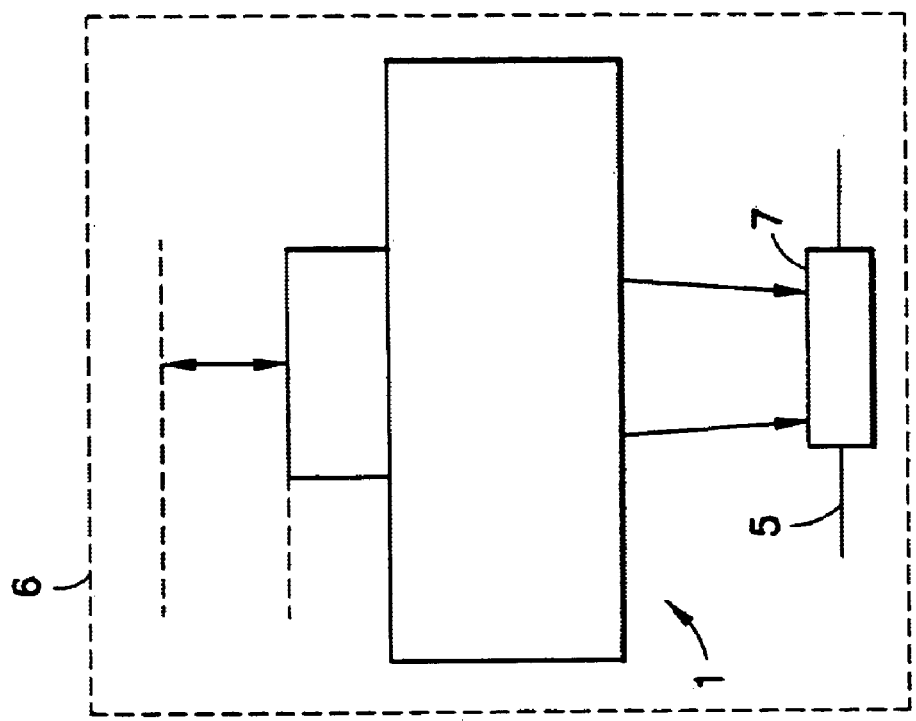
FIG. 1a is a schematic illustration of a traditional lens system with a fixed sensor array.
Figure 4A:
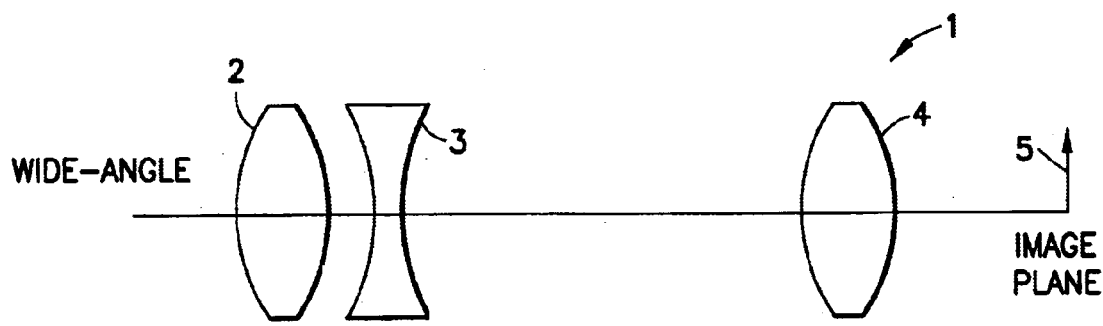
FIGS. 4a, 4b, 4c and 4d are schematic illustrations of a traditional lens system, showing the various relative positions of the lenses.
Figure 4B:
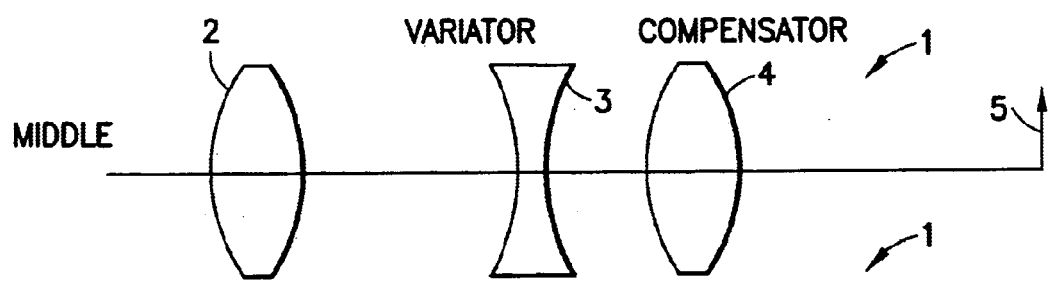
Figure 4C:
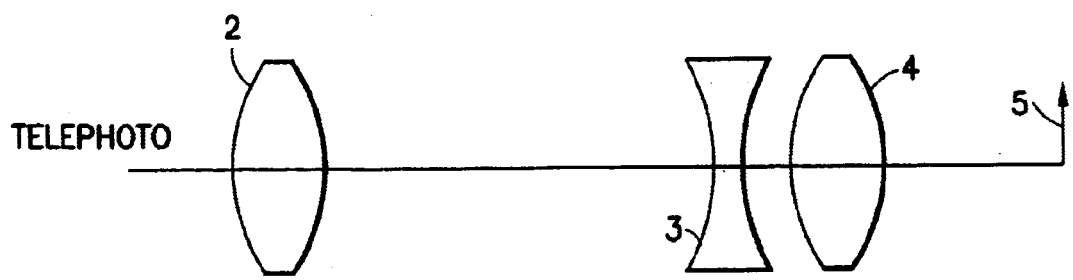
Figure 4D:
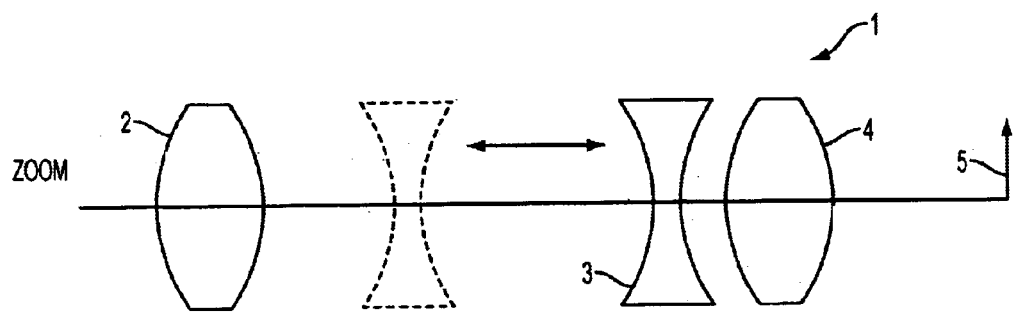

A typical optical lens system 1 for a camera having autofocus and zoom capability is depicted schematically in FIGS. 4a–4d. It generally will consists of a primary lens 2, a variator lens 3, and a compensator lens 4 which are operatively associated to project a focused image on image plane 5. As shown, the lens has three "principal" positions, i.e., wide angle, middle and telephoto. The zoom function, as shown in FIG. 4d, can be a smooth movement between the two end positions (wide and tele), as indicated by arrow 30, and do not necessary have to be a stepwise action with only three options. These variations in function are provided by moving the variator and compensator lens, 3 and 4 respectively, as shown. Lens system 1 is used in a digital camera 6, as shown in FIG. 1, in which the lens system 1 is secured within a housing (not shown) to project an image on an image sensor 7 positioned at the image plane 5 of the camera 6. The assembly of lens are adjusted, as shown in FIGS. 4a–4d to obtain autofocus and zoom functions.

In accordance with this invention, the mechanical movement of the lens system 1 is constructed through the use of advanced micro-machining techniques. Through such techniques, a semi-conductor image sensor can be combined with a lens system in a unique manner to obtain substantially the same functions as described above. The resulting image generating system can be exceedingly small and therefore can be conveniently packaged within the confines of a mobile communications device, such as a cellular telephone. As shown in FIG. 1b, a semi-conductor image sensor 9 is supported for movement by a micro-machined actuator assembly 10 in operative association with lens system 8 and positioned within the housing 11 of a digital camera or mobile communication device.

Figure 2:
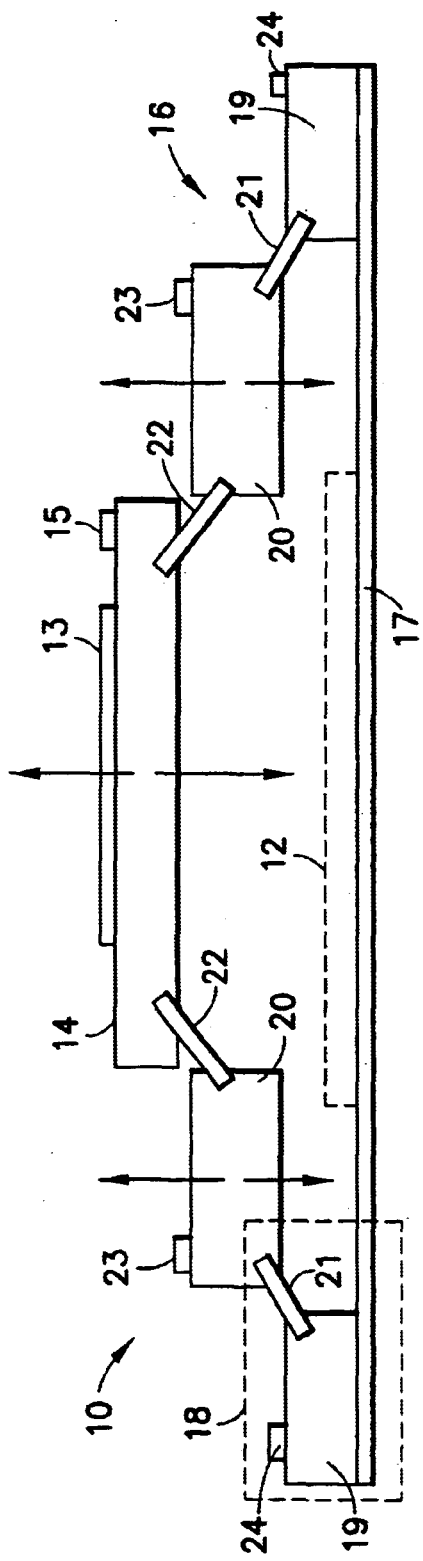
FIG. 2 is a schematic illustration of the sensor array of this invention fabricated with the MEMS component for multiple positions.

The actuating assembly 10 of the digital camera is shown in more detail in FIG. 2. In the actuating assembly 10, an image sensor 13 is constructed with its associated electronics on a semi-conductor chip 14. Terminal 15 provides the sensor 13 with appropriate electrical contact to power the sensor 13. A micro-electrical mechanical system (MEMS) 16 is formed on substrate 17 to support the sensor 13. MEMS 16 may take many different forms depending on the function of the camera and the fabricating technique used. For the purpose of illustration, a series of electrostatic resonators 18 are schematically shown. Electrostatic resonator 18 is an example of a linear actuator which can be used as a precise positioner, among other things. Actuator 18 consists of a pair of bases 19 which are fixed to the substrate 17 and moveable supports 20. Supports 20 are connected to bases 19 by means of electrostatic fingers 21. Sensor chip 13 is connected to movable supports 20 by a further pair of electrostatic fingers 22. The moveable supports 20 and the sensor chip 13 can be moved by applying a voltage between the moveable structure and its immediately adjacent supporting structure. For this purpose contacts 23 are provided on moveable support 20 and contacts 24 are provided on bases 19. The actuating assembly 10, as shown in FIG. 2, provides a two position motion utilizing the movement of moveable supports 20 on their associated bases 19 and the movement of the sensor 13 on supports 20. Further information with respect to MEMS is available from several sources, in particular, the MEMS and Nanotechnology Exchange, 1895 Preston White Drive, Suite 100, Reston, Va., 20191 and the University of Wisconsin Engineering Department.

Since, as shown in FIG. 2, the sensor 13 is shown mounted on the substrate 17, this particular embodiment could be adapted to provide autofocus, if used within a conventional lens system. If however the sensor 13 was mounted on the substrate 17 (see phantom lines 12) and replaced by a lens mounted on the illustrated support assembly, a zoom mechanism could be provided.

Figure 3:
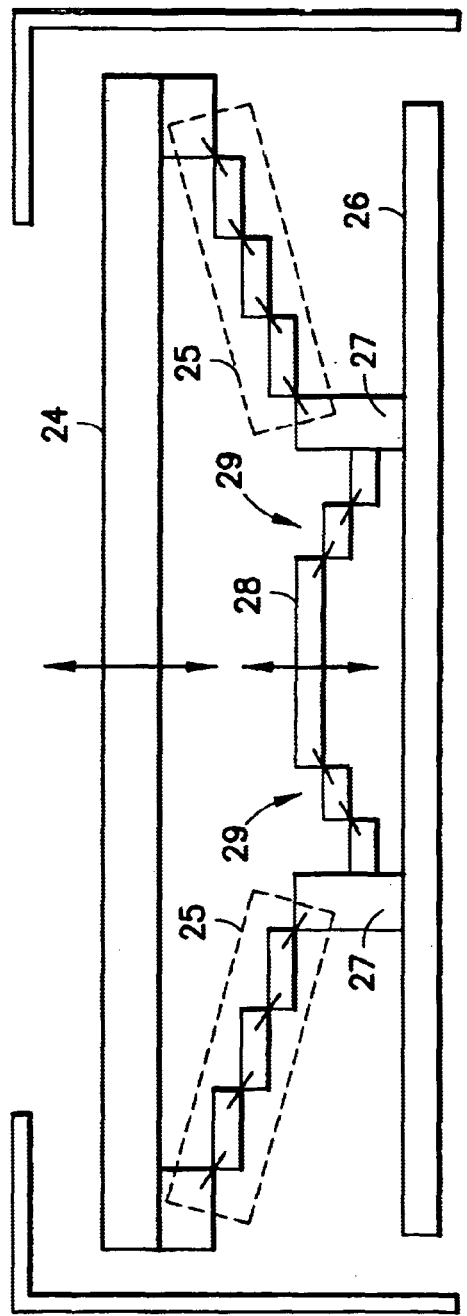
FIG. 3 is a schematic illustration of the sensor array and lens system fabricated and mounted for coordinated movement on the MEMS component.

In the alternate embodiment shown in FIG. 3, a MEMS support assembly is shown which may be adapted to provide both autofocus and zoom functions. In this embodiment, a lens 24 is mounted on a three position (or smoothly variable) MEMS support assembly 25 to the substrate 26 through base element 27. An image sensor 28 is also mounted for independent motion on a two position MEMS support 29. This system may be adapted to provide both an autofocus and a zoom capability.

The image sensor used herein is a semiconductor C-MOS sensor array constructed using standard silicon processing techniques which are compatible with the MEMS fabrication process. In addition appropriate electronic or manual systems would be connected to initiate operation of the functions provided. Ideally the sensor array is constructed on a chip with imbedded control circuitry including sensors, memory, and other functions.

The MEMS technique used may be surface micromachining. This method is an additive fabrication technique which involves the building of the device on top of the supporting substrate. The substrate would be constructed with the necessary imbedded control circuitry, for example as an application specific semi-conductor integrated circuit. In this way the digital image sensor and the micro-electromechanical zoom are manufactured on the same chip using silicon based microelectronics for the sensor and micromachining technology for the micro-electromechanical support.

In this manner a micro-miniature digital camera having a variety of basic functions can be fabricated in a cost effective manner for use with a mobile communication device.

I claim:

1. A digital camera system comprising:
    a lens assembly mounted for receiving an image and projecting said image on an image plane;
    a micro-electromechanical (MEMS) system support mechanism for providing at least two positions of movement to a supported element, said MEMS support mechanism being fabricated integrally with said supported element; and
    a semi-conductor image sensor mounted at said image plane for movement on said MEMS system support mechanism and being operatively associated with said lens assembly to generate a digital image.

2. A digital camera system, according to claim 1, wherein said MEMS system support mechanism is an electrostatic resonator.

3. A digital camera system, according to claim 1, wherein the image sensor is fabricated on a silicon chip in which is imbedded control circuitry and said MEMS system support mechanism is integrally fabricated therewith.

4. A digital camera system, according to claim 1, wherein said movement of said image sensor provides an auto focus function.

5. A digital camera system, according to claim 1, wherein said lens assembly is mounted for movement on said MEMS system support mechanism for movement relative to said image sensor and said image sensor is fixed, said movement adapted to provide a zoom function.

6. A digital camera system, according to claim 1, further comprising:
    a substrate for supporting said digital camera system;
    a first MEMS fabricated on said substrate and connected to said lens assembly for providing movement of said lens assembly between at least two positions;
    a second MEMS fabricated on said substrate and connected to said image sensor for providing movement of said image sensor between at least two positions; and
    wherein said movement of said lens system and said image sensor is relative to each other to provide both an autofocus and zoom function.

7. A mobile communication device including a system to transmit data over a communication network comprising:
    a housing containing said system to transmit data;
    a lens assembly mounted within said housing for receiving an image and projecting said image on an image plane;
    a micro-electromechanical (MEMS) system support mechanism for providing at least two positions of movement to a supported element, said MEMS system support mechanism being fabricated integrally with said supported element; said MEMS system support mechanism mounted within said housing; and
    a semi-conductor image sensor mounted at said image plane for movement on said MEMS system support mechanism and being operatively associated with said lens assembly to generate a digital image.

8. A mobile communication device including a system to transmit data over a communication network, according to claim 7, wherein said MEMS system support mechanism is an electrostatic resonator.

9. A mobile communication device including a system to transmit data over a communication network, according to claim 7, wherein the image sensor is fabricated on a silicon chip in which is imbedded control circuitry and said MEMS system support mechanism is integrally fabricated therewith.

10. A mobile communication device including a system to transmit data over a communication network, according to claim 7, wherein said movement of said image sensor provides an auto focus function.

11. A mobile communication device including a system to transmit data over a communication network, according to claim 7, wherein said lens assembly is mounted for movement on said MEMS system support mechanism for movement relative to said image sensor and said image sensor is fixed, said movement adapted to provide a zoom function.

12. A mobile communication device including a system to transmit data over a communication network, according to claim 7, further comprising:

a substrate for supporting said digital camera system;

a first MEMS fabricated on said substrate and connected to said lens system for providing movement of said lens system between at least two positions;

a second MEMS fabricated on said substrate and connected to said image sensor for providing movement of said image sensor between at least two positions; and wherein said movement of said lens assembly and said image sensor is relative to each other to provide both an autofocus and zoom function.

\* \* \* \* \*